United States Patent
Choi et al.

(10) Patent No.: US 9,012,077 B2
(45) Date of Patent: Apr. 21, 2015

(54) POSITIVE ELECTRODE INCLUDING A BINDER FOR RECHARGEABLE LITHIUM BATTERY AND RECHARGEABLE LITHIUM BATTERY INCLUDING THE SAME

(75) Inventors: Nam-Soon Choi, Yongin-si (KR); Sae-Weon Roh, Yongin-si (KR); Yong-Chul Park, Yongin-si (KR); Sung-Soo Kim, Yongin-si (KR); So-Hyun Hur, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 677 days.

(21) Appl. No.: 12/903,100

(22) Filed: Oct. 12, 2010

(65) Prior Publication Data
US 2011/0123863 A1  May 26, 2011

(30) Foreign Application Priority Data

Nov. 20, 2009 (KR) .................. 10-2009-0112856

(51) Int. Cl.
*H01M 4/62* (2006.01)
*H01M 10/052* (2010.01)
*H01M 10/0567* (2010.01)
*H01M 10/0568* (2010.01)
*H01M 10/0569* (2010.01)

(52) U.S. Cl.
CPC ............ *H01M 4/621* (2013.01); *H01M 4/622* (2013.01); *H01M 4/623* (2013.01); *H01M 10/052* (2013.01); *H01M 10/0567* (2013.01); *H01M 10/0568* (2013.01); *H01M 10/0569* (2013.01); *Y02E 60/122* (2013.01)

(58) Field of Classification Search
USPC .............. 429/217, 212, 233, 209, 224, 223, 429/231.1, 231.3
See application file for complete search history.

(56) References Cited

U.S. PATENT DOCUMENTS

| 5,450,666 A * | 9/1995 | Conn et al. ............... 29/890.043 |
| 6,994,429 B1 * | 2/2006 | McEntee et al. ............... 347/85 |
| 7,931,984 B2 | 4/2011 | Choi et al. |
| 2003/0091908 A1 * | 5/2003 | Takayanagi ..................... 430/5 |
| 2009/0305132 A1 * | 12/2009 | Gauthier et al. ............. 429/207 |

FOREIGN PATENT DOCUMENTS

| JP | 09-139199 | 5/1997 |
| JP | 2002-298852 | 10/2002 |
| JP | 2003-268053 | 9/2003 |
| JP | 2004-281055 | 10/2004 |
| JP | 2006-278308 | 10/2006 |
| JP | 2006-302553 | 11/2006 |
| KR | 10-2001-0010226 A | 2/2001 |
| KR | 10-2003-0097009 | 12/2003 |
| KR | 10-2009-0110133 | 10/2009 |
| WO | WO 2006/120332 | * 11/2006 ............ H01M 10/40 |

OTHER PUBLICATIONS

KIPO Office Action dated Aug. 19, 2011 for Korean priority Patent Application No. 10-2009-0112856, 4 pages.
Patent Abstract of Japan and English Machine Translation of Japan Publication No. JP 2003-268053 listed above, 16 pages.
KIPO Notice of Allowance dated Nov. 21, 2011 in priority Korean application No. 10-2009-0112856, pp. 1-4.

* cited by examiner

*Primary Examiner* — Raymond Alejandro

(74) *Attorney, Agent, or Firm* — Christie, Parker & Hale, LLP

(57) ABSTRACT

A positive electrode and a rechargeable lithium battery including the same, the positive electrode including a current collector and a positive active material layer disposed on the current collector. The positive active material layer includes a positive active material and a binder including an ion conductive polymer including a carboxylate group.

15 Claims, 1 Drawing Sheet

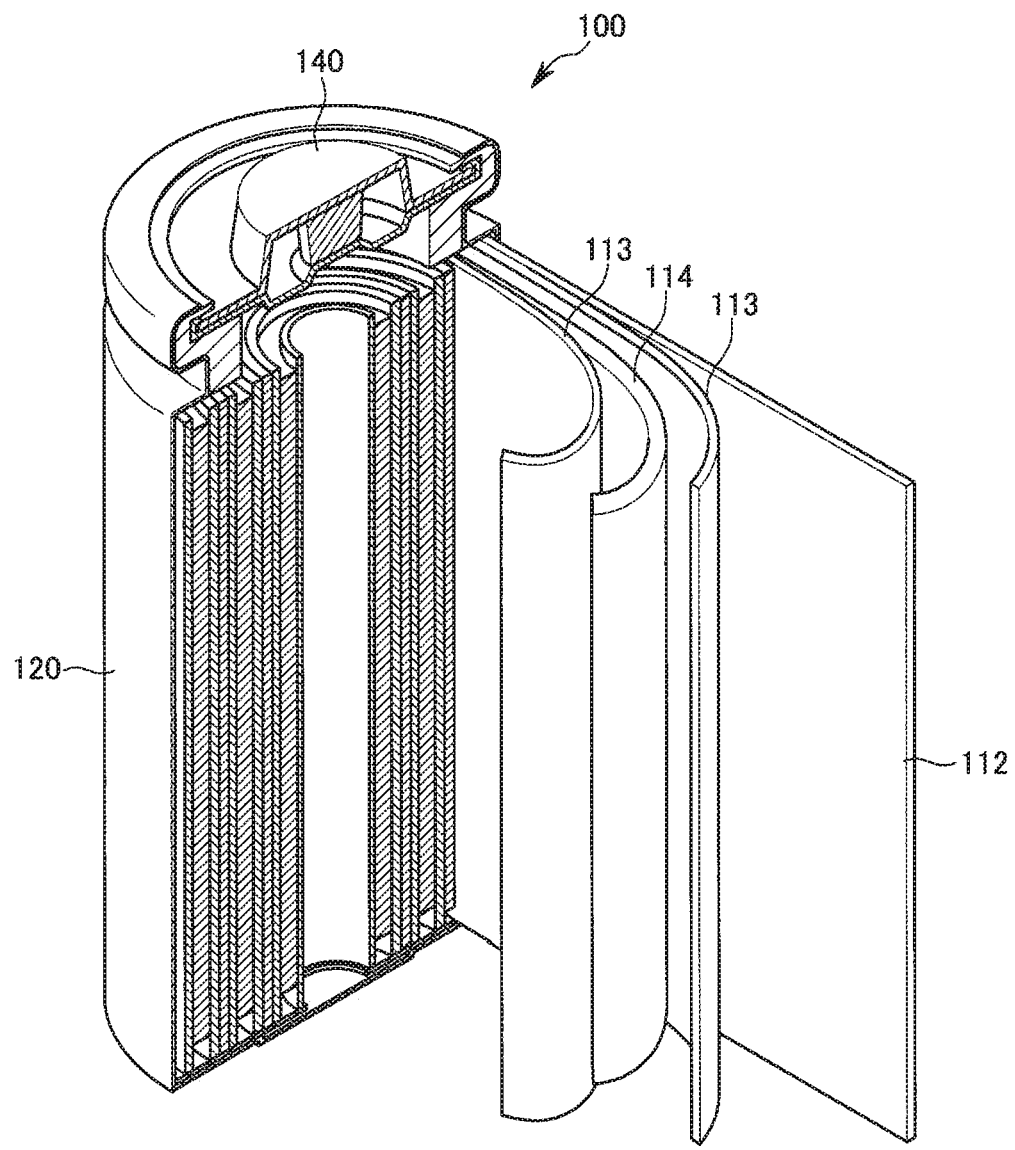

POSITIVE ELECTRODE INCLUDING A BINDER FOR RECHARGEABLE LITHIUM BATTERY AND RECHARGEABLE LITHIUM BATTERY INCLUDING THE SAME

CROSS-REFERENCE TO RELATED APPLICATION

This application claims the benefit of Korean Application No. 10-2009-0112856, filed in the Korean Intellectual Property Office, on Nov. 20, 2009, the disclosure of which is incorporated herein, by reference.

BACKGROUND

1. Field

This disclosure relates to a positive electrode for a rechargeable lithium battery and a rechargeable lithium battery including the same.

2. Description of the Related Art

Lithium rechargeable batteries have recently drawn attention as a power source of portable electronic devices. They use an organic electrolyte solution and thereby have twice the discharge voltage of a conventional battery using an alkali aqueous solution and accordingly, have a high energy density.

For positive active materials of a rechargeable lithium battery, lithium-transition element composite oxides capable of intercalating lithium, such as $LiCoO_2$, $LiMn_2O_4$, $LiNi_{1-x}Co_xO_2$ (0<x<1), and the like have been researched. A positive electrode including lithium manganese oxide, such as $LiMn_2O_4$, has problems in that manganese ions are eluted into the electrolyte solution at high temperatures, limiting battery applications.

In order to minimize this phenomenon, the lithium manganese oxide particles are coated with aluminum-based oxide, such as $Al_2O_3$, $Al_3PO_4$ or the like. However, this method cannot ensure suitably cycle-life characteristics at high temperatures, since it is difficult to completely prevent the manganese ion elution.

SUMMARY

One aspect of this disclosure provides a positive electrode for a rechargeable lithium battery, having improved cycle-life characteristics, due to the suppression of transition element ion elution from a positive active material.

Another aspect of this disclosure provides a rechargeable lithium battery including the positive electrode.

According to various embodiments, a positive electrode for a rechargeable lithium battery is provided that includes a current collector; and a positive active material layer formed on the current collector. The active material layer includes a positive active material and a binder. The binder includes an ion conductive polymer including a carboxylate group.

According to various embodiments, the positive active material may be selected from the group consisting of $LiCoO_2$, $LiMn_2O_4$, $LiMnPO_4$, $LiFePO_4$, $LiNiO_2$, $LiNi_{1/3}Co_{1/3}Mn_{1/3}$, and a combination thereof.

According to various embodiments, the ion conductive polymer including a carboxylate group may include a repeating unit represented by the following Chemical Formula 1 and may further include a repeating unit represented by the following Chemical Formula 2:

  [Chemical Formula 1]

In the above Chemical Formula 1: $R_1$ is hydrogen, a C1 to C10 alkyl group, or an alkylene oxide group; $R_2$ is a carboxylate group (—COO); M is $Li^+$, $Na^+$, or $K^+$; and $R_3$ is a C1 to C10 alkylene group.

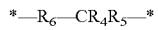  [Chemical Formula 2]

In the above Chemical Formula 2: $R_4$ is hydrogen, a C1 to C10 alkyl group, or an alkylene oxide group; $R_5$ is —COOH, —COOR' (R' is a C1 to C10 alkyl group), or —$SO_3H$; and $R_3$ is a C1 to C10 alkylene group.

According to various embodiments, the ion conductive polymer includes about 5 to about 100 mol % of a repeating unit represented by the above Chemical Formula 1 and about 0 to about 95 mol % of a repeating unit represented by the above Chemical Formula 2.

According to various embodiments, the ion conductive polymer has a weight average molecular weight of about 10,000 to about 500,000 g/mol.

According to various embodiments, the binder may further include a vinylidene fluoride-based polymer.

According to various embodiments, the vinylidene fluoride-based polymer may be selected from the group consisting of polyvinylidene fluoride, a copolymer of vinylidene fluoride and fluorinated alkylene, and a combination thereof. The fluorinated alkylene may be selected from the group consisting of hexafluoro propylene, trifluoro ethylene, tetrafluoro ethylene, and a combination thereof. The copolymer of vinylidene fluoride and fluorinated alkylene may include the fluorinated alkylene in 0.1 to 20 wt %.

According to various embodiments, the vinylidene fluoride-based polymer may have a weight average molecular weight of 100,000 to 1,000,000 g/mol.

According to various embodiments, the binder may include 10 to 90 wt % of the vinylidene fluoride-based polymer and 10 to 90 wt % of an ion conductive polymer including a carboxylate group.

According to various embodiments, the positive active material layer may further include a conductive agent. The conductive agent may be selected from the group consisting of natural graphite, artificial graphite, carbon black, acetylene black, ketjen black, carbon fiber, metal powder, metal fiber, and a combination thereof.

According to various embodiments, the positive active material layer may include 80 to 95 wt % of the positive active material, 2.5 to 15 wt % of the binder, and 2.5 to 10 wt % of the conductive agent.

According to other aspects of this disclosure, a rechargeable lithium battery includes the positive electrode; a negative electrode; and an electrolyte solution.

According to various embodiments, the positive electrode may improve cycle-life characteristics, by suppressing transition metal ion elution from the positive active material, in the rechargeable lithium battery.

Additional aspects and/or advantages of the present disclosure will be set forth in part in the description which follows and, in part, will be obvious from the description, or may be learned by practice of the present disclosure.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings, of which:

FIG. 1 is a schematic view of a rechargeable lithium battery according to one exemplary embodiment.

DETAILED DESCRIPTION

Reference will now be made in detail to the exemplary embodiments of the present disclosure, examples of which are illustrated in the accompanying drawings, wherein like reference numerals refer to the like elements throughout. The exemplary embodiments are described below in order to explain the present disclosure, by referring to the figures. However, these embodiments are only exemplary, and this disclosure is not limited thereto.

A positive electrode for a rechargeable lithium battery, according to one exemplary embodiment, includes a current collector and a positive active material layer disposed on the current collector. The positive active material layer includes a positive active material and a binder. The binder includes a vinylidene fluoride-based polymer and an ion conductive polymer including a carboxylate group. The binder suppresses transition metal ion elution from the positive active material.

The positive active material may include lithium transition metal oxide, and for example, it may be selected from the group consisting of $LiCoO_2$, $LiMn_2O_4$, $LiMnPO_4$, $LiFePO_4$, $LiNiO_2$, $LiNi_{1/3}CO_{1/3}Mn_{1/3}$, and a combination thereof. In particular, the positive active material may include a manganese-based oxide selected from the group consisting of $LiMn_2O_4$, $LiMnPO_4$, $LiNi_{1/3}CO_{1/3}Mn_{1/3}$, and a combination thereof. The manganese-based oxides have an excellent thermal stability that is superior to other transition metal oxides.

The binder, according to one exemplary embodiment, may trap transition metal ions eluted from the lithium transition metal oxide. The binder includes an ion conductive polymer including a carboxylate group.

The ion conductive polymer includes an ionomer including a carboxylate group. Examples thereof may include a repeating unit represented by the following Chemical Formula 1.

   [Chemical Formula 1]

In the above Chemical Formula 1: $R_1$ is hydrogen, a C1 to C10 alkyl group, or an alkylene oxide group; $R_2$ is a carboxylate group (—COO); M is $Li^+$, $Na^+$, or $K^+$; and $R_3$ is a C1 to C10 alkylene group.

The ion conductive polymer may further include a repeating unit represented by the following Chemical Formula 2, in addition to the repeating unit represented by Chemical Formula 1.

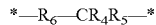   [Chemical Formula 2]

In the above Chemical Formula 2: $R_4$ is hydrogen, a C1 to C10 alkyl group, or an alkylene oxide group; $R_5$ is —COOH, —COOR' (R' is a C1 to C10 alkyl group), or —$SO_3H$; and $R_6$ is a C1 to C10 alkylene group.

The ion conductive polymer, according to one exemplary embodiment, has a carboxylate group as shown in Chemical Formula 1. The carboxylate group traps transition metal ions eluted from the positive active material of lithium transition metal oxide, to form coordinate covalent bonds. Thereby, the transition elements ions are surrounded by the ion conductive polymers, so as to suppress the elution thereof.

The ion conductive polymer may further include a repeating unit represented by Chemical Formula 2. In particular, the ion conductive polymer may include about 5 to about 100 mol % of a repeating unit represented by Chemical Formula 1 and about 0 to about 95 mol % of a repeating unit represented by Chemical Formula 2. For example, it may include 50 to about 95 mol % of a repeating unit represented by Chemical Formula 1 and about 5 to about 50 mol % of a repeating unit represented by Chemical Formula 2. When the ion conductive polymer has such a composition ratio, it is possible to effectively trap the manganese ions eluted at a high temperature. If the repeating unit including ion is increased in the ion conductive polymer, the glass transition temperature (Tg) of the polymer may be increased, such that the electrode becomes brittle. However, electrode flexibility is not significantly reduced by the compatibility with electrolyte solution. Therefore, an electrolyte solution retaining property is improved.

The ion conductive polymer may have a weight average molecular weight of 10,000 to 500,000 g/mol, or for example, of 50,000 to 400,000 g/mol. When the ion conductive polymer has such a weight average molecular weight, it has good adherence to the current collector and delamination from the current collector, during the repeated charging/discharging, is minimized.

The binder, according to one exemplary embodiment, may further include a vinylidene fluoride-based polymer in addition to the ion conductive polymer. The vinylidene fluoride-based polymer may be selected from the group consisting of polyvinylidene fluoride, a copolymer of vinylidene fluoride and fluorinated alkylene, and a combination thereof.

The fluorinated alkylene is selected from the group consisting of hexafluoro propylene, trifluoro ethylene, tetrafluoro ethylene, and a combination thereof. The inclusion of the hexafluoro propylene suppresses crystallization of the polymer, because the copolymer chain includes —$CF_3$ terminal groups, and it improves electrolyte impregnation, by increasing amorphous regions in the copolymer. The hexafluoro propylene also decreases costs, by lowering the melting point (Tm) of the copolymer.

The copolymer of vinylidene fluoride and fluorinated alkylene may include the fluorinated alkylene in 0.1 to 20 wt %, or for example, 5 to 12 wt %. When the fluorinated alkylene is included within the range, the appropriate amorphous region is provided, so the electrolyte solution is easily impregnated. The electrode is also formed at a temperature of 150 to 170° C., using a thermo-compression bonding process.

The vinylidene fluoride-based polymer may have a weight average molecular weight of 100,000 to 1,000,000 g/mol, or for example, of 200,000 to 700,000 g/mol. When the vinylidene fluoride-based polymer has the weight average molecular weight within the range, the adherence of the active material to the current collector is maintained, thereby minimizing de-lamination of the active material from the current collector, during charging and discharging.

The binder, according to one exemplary embodiment, may include 10 to 90 wt % of the vinylidene fluoride-based polymer and 10 to 90 wt % of the ion conductive polymer, or for example, it includes 50 to 80 wt % of the vinylidene fluoride-based polymer and 20 to 50 wt % of the ion conductive polymer. When the binder is provided with such a composition ratio, the mixed vinylidene fluoride-based polymer provides an electrode with good flexibility, due to having a low glass transition temperature (Tg: about −45° C.). The ion conductive polymer traps the eluted manganese ions and suppresses the transportation thereof to the negative electrode.

The positive active material layer including the positive active material and the binder may further include a conductive agent. The conductive agent enhances conductivity and may include any suitable electronically conductive material, as long as it does not cause the chemical change in the battery. Examples thereof may be selected from the group consisting of natural graphite; artificial graphite; carbon black; acetylene black; ketjen black; carbon fiber; a metal powder or fiber such as copper, nickel, aluminum, silver or the like; and a combination thereof. The conductive agent may include a mixture of conductive materials, such as a polyphenylene derivative, or the like.

The positive active material layer, according to one exemplary embodiment, may include 80 to 95 wt % of the positive active material, 2.5 to 15 wt % of the binder, and 2.5 to 10 wt % of the conductive agent. When the positive active material layer is provided within such a composition range, it is possible to effectively suppress the elution of transition metal ions therefrom.

The positive active material layer is positioned on a current collector, to form the positive electrode. The current collector may include Al, but is not limited thereto.

The positive electrode may be fabricated by mixing the positive active material, the binder, and optionally a conductive agent, in a solvent, to obtain a positive active material composition and coating the composition on a current collector. Positive electrode manufacturing methods are well known, and will not be described in detail herein. The solvent may include N-methylpyrrolidone, but is not limited thereto.

The provided positive electrode suppresses the elution of transition metal ions from the positive active material and improves the cycle-life characteristics of a rechargeable lithium battery including the positive electrode.

Rechargeable lithium batteries may be classified as lithium-ion batteries, lithium ion polymer batteries, and lithium polymer batteries, according to the presence of a separator and the kind of electrolyte used in the battery. The rechargeable lithium batteries may have a variety of shapes and sizes, include cylindrical, prismatic, or coin-type batteries, and may be thin film batteries or may be rather bulky in size. Structures and fabricating methods for lithium ion batteries are well known in the art.

FIG. 1 is a schematic view of a representative structure of a rechargeable lithium battery 100. The rechargeable lithium battery 100 includes a negative electrode 112, a positive electrode 114, a separator 113 interposed between the negative electrode 112 and the positive electrode 114, and a flame retardant electrolyte solution (not shown) impregnating the negative electrode 112, positive electrode 114, and separator 113. The negative electrode 112, positive electrode 114, and separator 113 are sequentially stacked, spirally wound, and placed in a battery case 120 that is then sealed by a sealing member 140, to fabricate such a rechargeable lithium battery 100.

The positive electrode 114 is the same as above described. The negative electrode 112 includes a current collector and a negative active material layer disposed on the current collector. The negative active material layer includes a negative active material. The negative active material includes a material that reversibly intercalates lithium ions, lithium metal, a lithium metal alloy, a material being capable of doping lithium, or a transition metal oxide.

The material that reversibly intercalates lithium ions includes carbon materials. The carbon material may be any carbon-based negative active material generally used in a lithium ion rechargeable battery. Examples of the carbon material include crystalline carbon, amorphous carbon, and a mixture thereof. The crystalline carbon may be non-shaped, or sheet, flake, spherical, or fiber shaped, natural graphite or artificial graphite. The amorphous carbon may be a soft carbon (carbon obtained by sintering at a low temperature), a hard carbon (carbon obtained by sintering at a high temperature), mesophase pitch carbide, fired coke, and so on.

Examples of the lithium metal alloy include lithium and Na, K, Rb, Cs, Fr, Be, Mg, Ca, Sr, Si, Sb, Pb, In, Zn, Ba, Ra, Ge, Al, or Sn. Examples of the material being capable of doping lithium include Si, $SiO_x$ ($0<x<2$), a Si—Y alloy (where Y is an element selected from the group consisting of an alkali metal, an alkaline-earth metal, a group 13 element, a group 14 element, a transition element, a rare earth element, and combinations thereof, and is not Si), Sn, $SnO_2$, Sn—Y (where Y is an element selected from the group consisting of an alkali metal, an alkaline-earth metal, a group 13 element, a group 14 element, a transition element, a rare earth element, and combinations thereof, and is not Sn), or mixtures thereof. At least one of these materials may be mixed with $SiO_2$. The element Y may include Mg, Ca, Sr, Ba, Ra, Sc, Y, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

Examples of the transition metal oxide include vanadium oxide, lithium vanadium oxide, and the like. The negative active material layer includes a binder, and optionally a conductive agent.

The binder improves the binding of the negative active material particles to each other and to a current collector. Examples of the binder include at least one selected from the group consisting of polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

Any electrically conductive material may be used as the conductive material, unless it causes a chemical change. Examples of the conductive material include natural graphite, artificial graphite, carbon black, acetylene black, ketjen black, a carbon fiber, a metal powder or a metal fiber including copper, nickel, aluminum, silver, and so on, and a polyphenylene derivative.

The current collector may include a copper foil, a nickel foil, a stainless steel foil, a titanium foil, a nickel foam, a copper foam, a polymer substrate coated with a conductive metal, or combinations thereof. The negative electrode may be fabricated by mixing the negative active material, a conductive material, and a binder to provide a negative active material composition, and coating the composition on a current collector. The solvent can be N-methylpyrrolidone, but it is not limited thereto.

The electrolyte solution includes a non-aqueous organic solvent and a lithium salt. The non-aqueous organic solvent operates as a medium for the transfer of lithium ions taking part in the electrochemical reactions of a battery.

The non-aqueous organic solvent may include a carbonate-based solvent, an ester-based solvent, an ether-based solvent, a ketone-based solvent, an alcohol-based solvent, or an aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and so on, and examples of the ketone-based solvent include cyclohexanone and the like. Examples of the alcohol-based solvent include ethyl alcohol, isopropyl alcohol, and so on, and examples of the aprotic solvent include nitriles such as R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be controlled in accordance with a desirable battery performance. The carbonate-based solvent may include a mixture of a cyclic carbonate and a linear carbonate. The cyclic carbonate and the chain carbonate are mixed together in the volume ratio of about 1:1 to about 1:9. When the mixture is used as an electrolyte, the electrolyte performance may be enhanced.

In one exemplary embodiment, the electrolyte may include mixtures of carbonate-based solvents and aromatic hydrocarbon-based solvents. The carbonate-based solvents and the aromatic hydrocarbon-based solvents may be mixed together in the volume ratio of about 1:1 to about 30:1.

The aromatic hydrocarbon-based organic solvent may be represented by the following Chemical Formula 3.

[Chemical Formula 3]

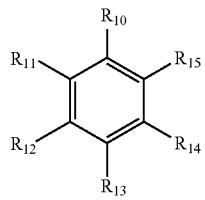

In the above Chemical Formula 3, R10 to R15 are independently hydrogen, halogen, a C1 to C10 alkyl group, a haloalkyl group, or a combination thereof.

The aromatic hydrocarbon-based organic solvent includes benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound of the following Chemical Formula 4 in order to improve cycle-life of a battery.

[Chemical Formula 4]

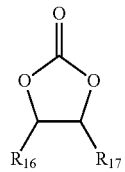

In the above Chemical Formula 4, R16 and R17 are independently hydrogen, halogen, a cyano group (CN), a nitro group ($NO_2$), and a C1 to C5 fluorinated alkyl group, provided that at least one of R16 and R17 is halogen, a cyano group (CN), a nitro group ($NO_2$), or a C1 to C5 fluorinated alkyl group, and both R16 and R17 are not hydrogen.

The ethylene carbonate-based compound includes difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, or a combination thereof. The amount of the additive may be adjusted within an appropriate range to improve cycle life characteristics.

The lithium salt supplies lithium ions in the battery, performs a basic operation of a rechargeable lithium battery, and improves lithium ion transport between positive and negative electrodes. Non-limiting examples of the lithium salt include at least one supporting salt selected from $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, and $LiB(C_2O_4)_2$ (lithium bisoxalate borate, LiBOB). The lithium salt may be used at a concentration ranging from about 0.1 to about 2.0M. When the lithium salt is included at the above concentration range, electrolyte performance and lithium ion mobility may be enhanced, due to optimal electrolyte conductivity and viscosity.

The rechargeable lithium battery may further include a separator between a negative electrode and a positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Hereinafter, the embodiments are illustrated in more detail with reference to examples. However, the following are exemplary embodiments and are not limiting. A person having ordinary skills in this art can sufficiently understand parts of the present invention that are not specifically described.

Manufacture of Positive Electrode

Example 1

A positive active material of $LiMn_2O_4$, a binder of P(MMA-co-LiMA) (copolymer of methyl methacrylate and lithium methacrylic acid, including the LiMA in 10 mol %, based on the total amount of the copolymer), and a conductive agent of carbon black were mixed in a ratio of 85 wt %, 8 wt %, and 7 wt %, and dispersed in N-methyl-2-pyrrolidone, to provide a composition for a positive active material layer. The composition was coated on an aluminum foil having a thickness of 15 μm and dried at 100° C., for one hour. The dried positive electrode was compressed by 50% (with respect to the pre-pressed thickness), to provide a positive electrode having an appropriate electrical conduction network.

Example 2

A positive active material of $LiMn_2O_4$, a binder of polyvinylidene fluoride and P(MMA-co-LiMA) (copolymer of methyl methacrylate and lithium methacrylic acid, including the LiMA in 10 mol %, based on the total amount of the copolymer), which was dissolved in a mixed solvent of and N-methyl-2-pyrrolidone (NMP) and methanol (90:10 weight ratio), were mixed in 90 wt % and 10 wt %, respectively, and a conductive agent of carbon black were mixed in a ratio of 85 wt %, 8 wt %, and 7 wt %, and dispersed in N-methyl-2-pyrrolidone, to provide a composition for a positive active material layer. The composition was coated on an aluminum foil having a thickness of 15 μm and dried at 100° C., for one hour. The dried positive electrode was compressed by 50%, to provide a positive electrode having an appropriate electrical conduction network.

Example 3

A positive active material of $LiMn_2O_4$, a binder of polyvinylidene fluoride and P(MMA-co-LiMA) (copolymer of methyl methacrylate and lithium methacrylic acid, including the LiMA in 10 mol % based on of the total amount of the copolymer), which was dissolved in a mixed solvent of and N-methyl-2-pyrrolidone (NMP) and methanol (70:30 weight ratio), were mixed in 70 wt % and 30 wt %, respectively, and a conductive agent of carbon black were mixed in a ratio of 85 wt %, 8 wt %, and 7 wt %, and dispersed in N-methyl-2-pyrrolidone, to provide a composition for a positive active material layer. The composition was coated on an aluminum foil having a thickness of 15 μm and dried at 100° C., for one hour. The dried positive electrode was compressed by 50% (with respect to the pre-pressed thickness), to provide a positive electrode having an appropriate electrical conduction network.

Example 4

A positive active material of $LiMn_2O_4$, a binder of polyvinylidene fluoride and P(MMA-co-LiMA) (copolymer of methyl methacrylate and lithium methacrylic acid, including the LiMA in 10 mol % based on of the total amount of the copolymer), which was dissolved in a mixed solvent of and N-methyl-2-pyrrolidone (NMP) and methanol (50:50 weight ratio), were mixed in 50 wt % and 50 wt %, respectively, and a conductive agent of carbon black were mixed in a ratio of 85 wt %, 8 wt %, and 7 wt %, and dispersed in N-methyl-2-pyrrolidone, to provide a composition for a positive active material layer. The composition was coated on an aluminum foil having a thickness 15 μm and dried at 100° C., for one hour. The dried positive electrode was compressed by 50% (with respect to the pre-pressed thickness), to provide a positive electrode having an electrical conduction network.

Comparative Example 1

A positive active material of $LiMn_2O_4$, a binder of polyvinylidene fluoride, and a conductive agent of carbon black were mixed in a ratio of 85 wt %, 8 wt %, and 7 wt %, and dispersed in N-methyl-2-pyrrolidone, to provide a composition for a positive active material layer. The composition was coated on an aluminum foil having a thickness of 15 μm and dried at 100° C., for one hour. The dried positive electrode was compressed by 50% (with respect to the pre-pressed thickness), to provide a positive electrode having an appropriate electrical conduction network.

Comparative Example 2

A positive active material of $LiMn_2O_4$, a binder of polyvinylidene fluoride, and P(MMA-co-LiMA) (copolymer of methyl methacrylate and lithium methacrylic acid, including the LiMA in 10 mol % based on of the total amount of the copolymer), which was dissolved in a mixed solvent of and N-methyl-2-pyrrolidone (NMP) and methanol (90:10 weight ratio), were mixed in 95 wt % and 5 wt %, respectively, and a conductive agent of carbon black were mixed in a ratio of 85 wt %, 8 wt %, and 7 wt %, and dispersed in N-methyl-2-pyrrolidone, to provide a composition for a positive active material layer. The composition was coated on an aluminum foil having a thickness of 15 μm and dried at 100° C., for one hour. The dried positive electrode was compressed by 50% (with respect to the pre-pressed thickness), to provide a positive electrode having an appropriate electrical conduction network.

Manufacture of Rechargeable Lithium Battery

Rechargeable lithium batteries cell including the positive electrodes of Examples 1 to 4 and Comparative Examples 1 and 2 were fabricated in accordance with the following method, to measure the electrochemical characteristics thereof. Lithium metal electrodes were used as counter electrodes, to fabricate coin-type half-cells. As an electrolyte solution, $LiPF_6$ was dissolved in a mixed solution of ethylene carbonate (EC) and dimethyl carbonate (DMC) in a mixed volume ratio of 3:7, to provide a concentration of 1.3M.

Measurement of Positive Electrode Characteristic

Experimental Example 1

Measurement of 60° C. Storage Characteristic

The provided coin-type half-cells were charged under a 0.1 C constant current (CC) condition, and the cells were then disassembled. The de-lithiated positive electrodes obtained from the disassembled cells were washed with DMC and vacuum-dried at a room temperature, for one hour. The dried positive electrodes were immersed in a 1.3M $LiPF_6$ in EC/DMC (3/7 volume ratio) electrolyte solution and stored in an oven at 60° C., for 10 days. Afterward, the concentration of manganese ions eluted into the electrolyte solution was measured by ICP-MS (inductively coupled plasma mass spectrometry), and the results are shown in the following Table 1.

TABLE 1

| | manganese ion concentration (ppm) in electrolyte solution after storage at 60° C. for 10 days |
|---|---|
| Example 1 | 20 |
| Example 2 | 165 |
| Example 3 | 80 |
| Example 4 | 52 |
| Comparative Example 1 | 340 |
| Comparative Example 2 | 285 |

As shown in Table 1, Examples 1 to 4, using the binder including an ion conductive polymer including a carboxylate group, had lower manganese ion concentrations in the electrolyte solution than that of Comparative Examples 1 and 2. Thereby, it is understood that the ion conductive polymer including a carboxylate group trapped the eluted manganese ions and suppressed the transportation of manganese ions to a negative electrode.

Measurement of Rechargeable Lithium Battery Characteristic

Experimental Example 2

Measurement of 60° C. Cycle-Life Characteristic

The rechargeable lithium battery cells, including the positive electrodes of Examples 1 to 4 and Comparative Example 1 and 2, were measured for cycle-life characteristics.

In order to determine the cycle-life characteristics, the cells were charged and discharged once, at 2.75 V to 4.2 V and 0.1 C ↔ 0.1 C.

TABLE 2

| | 4.3 V charge: half-cell OCV (V) after storage at 60° C. for 10 days |
|---|---|
| Example 1 | 4.17 |
| Example 2 | 4.07 |
| Example 3 | 4.13 |
| Example 4 | 4.16 |
| Comparative Example 1 | 4.0 |
| Comparative Example 2 | 4.02 |

Experimental Example 3

Formation Efficiency

The half-cell including the positive electrodes of Examples 1 to 4 and Comparative Examples 1 and 2 were measured to determine the formation efficiency, during the formation charging and discharging. The results are shown in the following Table 3.

The formation charge was performed at 4.3V until 0.1 C and with discharging at 3V until 0.1 C.

TABLE 3

| | Formation efficiency (%) |
|---|---|
| Example 1 | 99.1 |
| Example 2 | 99.0 |
| Example 3 | 99.2 |
| Example 4 | 99.0 |
| Comparative Example 1 | 98.8 |
| Comparative Example 2 | 98.7 |

As shown in Table 3, it is confirmed that Examples 1 to 4 had higher formation efficiency than Comparative Examples 1 and 2.

Although a few exemplary embodiments of the present disclosure have been shown and described, it would be appreciated by those skilled in the art that changes may be made in these exemplary embodiments without departing from the principles and spirit of the invention, the scope of which is defined in the claims and their equivalents.

What is claimed is:

1. A positive electrode for a rechargeable lithium battery, comprising:
a current collector; and
a positive active material layer disposed on the current collector and comprising a positive active material and a binder comprising an ion conductive copolymer, the ion conductive copolymer consisting essentially of one or more first repeating units represented by Chemical Formula 1, and one or more second repeating units represented by Chemical Formula 2:

  Chemical Formula 1 wherein,
$R_1$ is hydrogen, a C1 to C10 alkyl group, or an alkylene oxide group,
$R_2$ is a carboxylate group (—COO),
M is a metal ion of $Li^+$, $Na^+$, or $K^+$, and
$R_3$ is a C1 to C10 alkylene group;

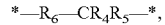  Chemical Formula 2 wherein,
$R_4$ is hydrogen, a C1 to C10 alkyl group, or an alkylene oxide group,
$R_5$ is —COOH, —COOR' (R' is a C1 to C10 alkyl group), or —$SO_3H$ and
$R_6$ is a C1 to C10 alkylene group.

2. The positive electrode of claim 1, wherein the positive active material is selected from the group consisting of $LiCoO_2$, $LiMn_2O_4$, $LiMnPO_4$, $LiFePO_4$, $LiNiO_2$, $LiNi_{1/3}Co_{1/3}Mn_{1/3}$, and a combination thereof.

3. The positive electrode of claim 1, wherein the positive active material is selected from the group consisting of $LiMn_2O_4$, $LiMnPO_4$, $LiNi_{1/3}Co_{1/3}Mn_{1/3}$, and a combination thereof.

4. The positive electrode of claim 1, wherein the ion conductive copolymer comprises about 50 mol % to about 95 mol % of the first repeating unit and about 5 mol % to about 50 mol % of the second repeating unit.

5. The positive electrode of claim 1, wherein the ion conductive copolymer has a weight average molecular weight of 10,000 g/mol to 500,000 g/mol.

6. The positive electrode of claim 1, wherein the binder further comprises a vinylidene fluoride-based polymer.

7. The positive electrode of claim 6, wherein the vinylidene fluoride-based polymer is selected from the group consisting of polyvinylidene fluoride, a copolymer of vinylidene fluoride and a fluorinated alkylene, and a combination thereof.

8. The positive electrode of claim 7, wherein the fluorinated alkylene is selected from the group consisting of hexafluoro propylene, trifluoro ethylene, tetrafluoro ethylene, and a combination thereof.

9. The positive electrode of claim 7, wherein the copolymer of vinylidene fluoride and the fluorinated alkylene comprises 0.1 to 20 wt % of the fluorinated alkylene.

10. The positive electrode of claim 6, wherein the vinylidene fluoride-based polymer has a weight average molecular weight of 100,000 g/mol to 1,000,000 g/mol.

11. The positive electrode of claim 6, wherein the binder comprises 10 wt % to 90 wt % of the vinylidene fluoride-based polymer and 10 wt % to 90 wt % of the ion conductive copolymer.

12. The positive electrode of claim 1, wherein the positive active material layer further comprises a conductive agent.

13. The positive electrode of claim 12, wherein the conductive agent is selected from the group consisting of natural graphite, artificial graphite, carbon black, acetylene black, ketjen black, carbon fiber, a metal powder, a metal fiber, and a combination thereof.

14. The positive electrode of claim 12, wherein the positive active material layer comprises 80 wt % to 95 wt % of the positive active material, 2.5 wt % to 15 wt % of the binder, and 2.5 to 10 wt % of the conductive agent.

15. A rechargeable lithium battery comprising:
the positive electrode of claim 1;
a negative electrode; and
an electrolyte solution.

* * * * *